United States Patent [19]
Krinski et al.

[11] 4,437,893
[45] Mar. 20, 1984

[54] USE OF SOY POLYSACCHARIDES AS A THICKENING AGENT FOR ALKALI SILICATE ADHESIVES

[75] Inventors: Thomas L. Krinski, Granite City, Ill.; Charles E. CoCo, Saint Louis, Mo.

[73] Assignee: Ralston Purina Company, St. Louis, Mo.

[21] Appl. No.: 470,408

[22] Filed: Feb. 28, 1983

[51] Int. Cl.$^3$ ............................................. C04B 19/04
[52] U.S. Cl. ......................................................... 106/80
[58] Field of Search ................................. 106/79, 80

[56] References Cited
U.S. PATENT DOCUMENTS

| | | | |
|---|---|---|---|
| 1,854,701 | 4/1932 | Laucks et al. | 106/79 |
| 2,457,108 | 12/1948 | Baker et al. | 106/79 |
| 2,681,290 | 6/1954 | Baker et al. | 106/79 |
| 2,894,847 | 7/1959 | Wright | 106/79 |
| 4,352,692 | 10/1982 | Krinski et al. | 106/79 |

*Primary Examiner*—James Poer
*Attorney, Agent, or Firm*—Virgil B. Hill

[57] ABSTRACT

A silicate containing adhesive is disclosed which is suitable for the production of laminated paper products comprising an aqueous solution of an alkali metal silicate together with soy polysaccharides in an amount effective to thicken the silicate solution, thereby providing a silicate adhesive which has good adhesive properties and may be used for bonding of two surfaces without excess penetration of the adhesive into either of the surfaces to be bonded.

26 Claims, No Drawings

USE OF SOY POLYSACCHARIDES AS A THICKENING AGENT FOR ALKALI SILICATE ADHESIVES

BACKGROUND OF THE INVENTION

The present invention relates to a silicate containing adhesive composition and process for producing the same.

Silicate containing adhesives have been widely used in the paper industry for the manufacture of laminated products such as corrogated board, paper tubes, paper cones and the like. Silicate adhesives are desirable for these uses because of their relatively low cost, ease of preparation and the strong adhesive bond they produce.

A variety of silicate containing adhesives have been disclosed in which a vegetable protein material is added to increase the shelf life or adhesive characteristics of the composition. U.S. Pat. No. 2,457,108 describes the preparation of a silicate adhesive which includes a vegetable protein flour in an amount of 2 to 50% to provide an increased shelf life for the silicate adhesive composition without a corresponding reduction in adhesiveness. U.S. Pat. No. 2,681,290 also describes a silicate containing adhesive composition wherein a vegetable protein-carbohydrate flour is employed and it is preferred that the flour have a starch level of greater than 15% by weight since this improves the working life and viscosity of the adhesive composition. Both of these compositions, however, require the application of heat in order to provide the necessary viscosity for adherence to the surfaces to be joined and finally to form the necessary bond between the two surfaces to be joined. Thus, while being acceptable for most applications, it would be preferred if a silicate adhesive composition having cold setting characteristics and higher viscosity at ambient temperatures could be developed since this would avoid the use of heat which is not always desirable in the manufacture of laminated paper products.

U.S. Pat. No. 2,894,847 describes a cold setting silicate adhesive composition which contains a soy insolate for thickening of the silicate composition and to provide the necessary adhesiveness. While the use of an isolate does provide an improvement in the properties of the silicate adhesive composition, nevertheless, somewhat lower silicate levels in the adhesive composition must be employed since the isolate will otherwise precipitate or not be capable of dispersion when a high level of silicate is used. Furthermore, such a composition requires a substantial percentage of isolate in order to provide the necessary solids level in the adhesive composition so that the composition will have the necessary viscosity and tack for application to the surfaces to be joined together.

The use of various types of cellulosic compounds as thickeners for silicate adhesives has also been proposed. U.S. Pat. No. 3,241,990 describes the use of cellulosic fibrous material such as wood pulp to control the viscosity of silicate solutions used in the formation of solid silaceous articles. Impregnating compositions to improve water resistance have also been proposed which comprise silicate solutions containing carbohydrates such as starch or cellulose derivatives.

In spite of the variety of approaches that have been used for the formation of silicate compositions, there is still a need for a cold setting silicate adhesive composition that is suitable as a bonding agent for paper products. The continuous production of bonded paper products require an adhesive which can be easily formed and maintains its consistency for application on a continuous basis. Furthermore, the adhesive should have sufficient viscosity so that the smallest amount possible is applied to achieve adhesion thereby improving the economics of the process as well as preventing excessive penetration of the adhesive into the relatively porous surfaces of paper products.

It is therefore an object of the present invention to provide a silicate containing adhesive composition having cold setting characteristics at a low enough solids level that it may be easily applied, yet that it has a substantial viscosity at ambient temperatures thereby providing the necessary tack and adhesive strength.

It is a further object of the present invention to provide a silicate containing adhesive composition which is of relatively low cost and other desirable characteristics in the production of laminated paper products and the like.

It is another object to provide a silicate adhesive composition that maintains its consistency to permit use in a continuous laminated paper making process.

These and other objects have been achieved in the present invention.

SUMMARY OF THE INVENTION

The present invention relates to a silicate containing adhesive composition suitable for the production of or manufacture of laminated paper products such as corrugated board, paper tubes, paper or wood laminates, and the like. The silicate containing adhesive composition of the present invention is characterized by the presence of a unique ingredient which swells upon addition to the silicate solution thereby providing substantial viscosity at a low level of addition and resulting in a composition which has the necessary tack so that a small quantity of adhesive may be added to the surfaces to be joined and result in a bond of superior adhesive strength. The composition of the present invention is especially well suited for use in a continuous process since the superior properties of the soy polysaccharide thickened silicate adhesive provides the composition with the consistency needed to permit the machines producing the laminated products to be operated at a higher running speed.

The silicate containing adhesive composition of the present invention comprises an aqueous solution of an alkaline metal silicate which contains a soy polysaccharide material in an amount effective to thicken the silicate solution. Preferably, the silicate solution contains between about 1 to 25% by dry weight of silicate of a soy polysaccharide material. The soy polysaccharide product is preferred for use in the present invention and comprises the cellulosic fraction derived from the processing of soybean products such as the production of soy isolate from soybean flour, soy flakes and the like. The silicate adhesive composition of the present invention thickens readily at ambient conditions upon addition of the soy polysaccharide and provides a composition with the necessary viscosity to permit easy application to the interface of the surfaces to be joined, thereby preventing excessive penetration of the adhesive composition if one of the surfaces is exceptionally porous. Furthermore, the silicate containing adhesive composition of the present invention does not require substantial heating for thickening or providing the necessary adhesive strength.

DESCRIPTION OF THE PREFERRED EMBODIMENTS

The silicate adhesive composition of the present invention comprises an aqueous solution of an alkali metal silicate which is prepared in a conventional manner and the alkali metal silicate that is preferred to form the adhesive composition of the present invention is preferably sodium silicate but may include the silicates of other alkali metals such as lithium, potassium, rubidium, and cesium. The exact type of alkali metal silicate which is employed in the present invention is not critical to its practice and a variety of commercial grades are suitable all of which have varying ratios of alkali metal oxide to silica and the present invention is not intended to be limited by the exact type of alkali metal silicate that may be employed.

The alkali metal silicate is initially dispersed and dissolved in water to form a solution having a typical but non-limiting level of alkali metal silicate of between about 20 to 45% by weight of said solution and preferably 26 to 36% by weight. Commercially available and prepared silicate solutions may be used with equal results. The silicate solution, because of the relatively high level of alkali metal silicate, typically has a pH of between about 13 and 14 and therefore represents a difficult problem insofar as the use of an additive and particularly a high protein additive to provide an adhesive composition since the protein material will readily dissolve in a solution with this pH thereby providing a solution which is incapable of thickening at ambient temperatures. A solution of this type is difficult to apply since it readily penetrates surfaces that are somewhat porous in nature.

The important feature of the present invention is the use of a unique additive for addition of the alkali metal silicate solution. This material, upon addition to the silicate solution, swells, thereby providing increased viscosity at a relatively low level of solids and at ambient temperatures, to provide an adhesive composition which may be readily applied to surfaces which are to be joined together. While cellulosic fibers such as wood pulp and the like also thicken silicate, they are difficult to grind and add to the silicate adhesives and do not provide as uniform of an adhesive composition as that which is thickened with the soy polysaccharide material. This lack of uniformity is particularly undesirable in a continuous problem where consistency of the adhesive is very important.

The unique material employed in the production of the silicate adhesive composition of the present invention is a soy polysaccharide material which comprises a mixture of residual high molecular weight sugars obtained by the treatment of soy flakes, meal or flour in order to remove the soluble proteins and carbohydrates. The heterogeneous polysaccharides are principally cell wall structural components of the soybean cotyledons and are typically obtained as a by product from the production of a vegetable protein isolate. The polysaccharide product has also sometimes been characterized as the aqueous alkaline insoluble residue or spent flake from soy isolate processing.

In order to illustrate the manner in which the soy polysaccharides are obtained from a process for the production of a soy isolate, a soybean starting material such as soy flakes, meal or flour is dispersed in an aqueous medium and the pH of the medium adjusted to at least about 7. The flakes, meal or flour are washed with the aqueous alkaline solution and subjected to centrifugation. The soluble carbohydrate and protein components are contained in the aqueous extract and the solid residue is composed of the soy polysaccharide products which comprises the solids phase. The solids are also sometimes referred to as the spent flake residue and would be typically discarded in an isolate process. The alkali insoluble residue or solids phase is then subjected to a second extraction with an aqueous alkaline solution to extract more residual protein and the aqueous extracts are then combined for further processing and subsequent acid precipitation of the protein isolate.

The residual material may then be cooked, dried or further processed to remove extraneous material if desired, therefore yielding the soy polysaccharide products which are preferably utilized in the present invention. The above description of a typical process for obtaining the soy polysaccharides is not intended to be limiting since this represents a conventional process known to those skilled in the art for the separation of the protein material and from the soy polysaccharide materials contained in the soy flour, flakes, meal or soybeans.

The highly fibrous soy polysaccharide material has a typical analysis after drying of a total carbohydrate content of about 80% by weight, a protein content of about 10 to 18% by weight, and an ash content of about 5% by weight. The soy polysaccharide material generally comprises the many high molecular weight carbohydrate polymers primarily contained in soybeans such as arabinose, galactose, mannose and xylose. The term soy polysaccharides refers to the high molecular weight carbohydrate polymers containing a mixture of polysaccharides primarily composed of arabinose, galactose, mannose and xylose. It is normally employed as a collective term to describe the fibrous carbohydrate material obtained from the cell wall structural components of soybeans including soy flakes, flour or meal.

It is preferred although not critical to grind the soy polysaccarides to a particle size of less than 0.15 mm diameter to provide for a uniform dispersion of the soy polysaccharide material in the adhesive composition. The soy polysaccharides are then added to the alkali metal silicate solution in an amount effective to thicken said solution and improve the adhesive properties thereof and typically between about 1-25% by dry weight of the silicate and preferably between about 2 and 8% by dry weight of the alkali metal silicate and most preferably between about 4 and 6% by dry weight of the alkali metal silicate. It is unique that such a small amount of this material is necessary to provide the necessary increase in the viscosity of the silicate containing adhesive composition and to do so without the application of heat. This is due to the unique characteristics of the soy polysaccharide product which does not substantially dissolve but swells in the highly alkaline silicate solution thereby providing an immediate and significant increase in viscosity of the product but without a substantial reduction in adhesive strength. This increase of viscosity at ambient temperatures provides a composition which has the necessary tack for application to the surfaces to be joined. This permits the application of a relatively small amount of silicate adhesive composition to achieve the necessary adhesion and further prevents undue penetration of the composition in the event either or both of the surfaces are relatively porous in nature.

The soy polysaccharides are simply added to the alkali silicate solution by dispersing therein for such a period of time such that a thickened dispersion is obtained and the exact temperature or time for which this dispersion is achieved is not critical to the practice of the present invention. An optional ingredient that may be employed in the preparation of the alkali metal silicate adhesive composition of the present invention is the addition of a dispersing or wetting agent which improves the dispersion of the soy polysaccharide in the adhesive composition without adversely effecting the adhesive strength thereof. Suitable materials include the following—lecithin, polyethylene glycols and related derivatives, preferably in an amount sufficient to provide dispersion of the polysaccharide material and most preferably at a level of between about 0.2 to 2.0% by weight. The following Examples represent specific but non-limiting embodiments of the present invention.

EXAMPLE 1

A commercially available solution of sodium silicate was used which contained 35% by weight of sodium silicate.

A soy polysaccharide material, which represents the dried "spent flake" fraction from soy isolate production which is produced generally in accord with U.S. Pat. No. 3,885,052, having a moisture content of about 10% by weight was ground to a particle size such that at least about 99% of the ground material will pass a U.S. #100 mesh screen, which has an opening of 0–15 mm.

2, 4, 6 and 8% by dry weight of the silicate were then added to separate portions of the sodium silicate solution and were evaluated for viscosity, stiffness and glueability as compared to the 35% sodium silicate solution itself which served as the control.

The viscosity of each of the above solutions was measured on a Brookfield Viscometer at 25° C. using #1 spindle at 60 rpm. These results are set forth in Table 1.

TABLE 1

| Viscosity of Silicate Solutions (CPS) | |
|---|---|
| % Soy Polysaccharide Material | CPS |
| 0 (Control) | 13 |
| 2 | 15 |
| 4 | 18 |
| 6 | 22 |
| 8 | 27 |

It may be seen that the viscosity of the silicate adhesives containing the soy polysaccharide material was higher than the control and generally increased according to the amount of soy polysaccharide that was added.

The glueability characteristics of each of the above solutions was measured by the Schmidt glueability test which is described in Operation Procedure For Measuring Glueability of Paperboard from Modern Metalcraft, Inc., Midland, Mich., at an application rate of 1.5 mil. The results of this testing are set forth in Table 2.

TABLE 2

| | Glueability Tests | | | |
|---|---|---|---|---|
| % Soy Polysaccharide | Set Time (seconds to 500 g force) | | | Total Gram Force at 30 sec. set time |
| | 0 sec. | 15 sec. | 30 sec. | |
| 0 (Control) | 39 | 24 | 15 | 1200 |
| 2 | 40 | 16 | 15 | 1650 |
| 4 | 40 | 22 | 15 | 1200 |
| 6 | 36 | 22 | 15 | 1350 |
| 8 | 38 | 22 | 15 | 1625 |

For a zero second set time the time to a 500 g force ranged between 36 and 40 seconds. For the 15 sec. set time, the range was 22–24 seconds except for the 2% soy polysaccharide product which took only 16 seconds.

After a 30 sec. set time, all adhesives achieved a 500 g set force at 15 seconds. It may be concluded that all adhesives including the control have equivalent time to a 500 g force.

Table 2 also shows the total gram force which was measured at the 30 seconds set time, which is representative to the overall bond strength. The adhesives containing the soy polysaccharide were equal or better in bond strength than the control.

To evaluate the total amount of adhesive applied by the control and the silicate adhesive containing 8% soy polysaccharide, a fixed 1.5 mil thickness layer was applied to kraft liner board using a 1.5 bird bar. The silicate adhesive applied 4.7% dry weight of adhesive per single board weight while the control applied 5.0%.

It may therefore be seen from the above data that silicate adhesives with the added soy polysaccharide material functioned as well as the pure silicate adhesive yet had a much better viscosity with a lower dry weight of application.

EXAMPLE 2

A commercially available solution of sodium silicate at 43% solids was used. To one portion of the solution 11.6% by dry weight of the silicate of soy flour was added. To a second portion of the silicate solution 11.6% by weight of the silicate of a soy polysaccharide material was added, which was produced as generally described in U.S. Pat. No. 3,885,052. The properties of each of the silicate solutions was visually observed and the viscosity at 60 rpm at 25° C. was measured. The final solids level of both silicate solutions was 47.7%.

It was determined that the silicate solution with the added soy flour had a viscosity of 1320 cps whereas the silicate solution with the added soy polysaccharide had a viscosity of 4100 cps. The soy flour further did not disperse or suspend well in the silicate solution and tended to separate at a much faster rate.

EXAMPLE 3

The sodium silicate adhesive with the added soy polysaccharide is evaluated in the production of a laminated paper product which consists of 7 plys glued together with the adhesive. The sodium silicate solution is prepared by preparing a 35% by weight of sodium silicate solution to which is added 8% by weight of the silicate of a soy polysaccharide material produced as generally described in U.S. Pat. No. 3,885,052. The two materials are mixed for about one hour, then applied to the surface of each ply prior to joining the plys. At the same time, a comparable laminated product is prepared using the 35% by weight sodium silicate solution without added soy polysaccharide. The laminated products prepared with the silicate adhesive containing the added soy polysaccharides showed at least a 95% degree of glue bonding immediately after the plys are joined together whereas the laminated product produced with sodium silicate solution without added soy polysaccharide showed an 80–85% degree of glue bonding after about 2 hours time.

Having described the present invention with reference to these specific embodiments, it is to be understood that numerous variations or substitutions may be made in the present invention without departing from the spirit thereof and it is intended to include all such variations, equivalents or substitutions within the scope of the present invention.

What is claimed is:

1. A silicate containing adhesive composition comprising an aqueous solution of an alkali metal silicate containing a soy polysaccharide material in an amount effective to thicken said solution and improve the adhesive properties thereof.

2. The composition of claim 1 wherein the aqueous solution contains between about 20 to 45% by weight of alkali metal silicate.

3. The composition of claim 1 wherein the amount of soy polysaccharide material is between about 1 to 25% by dry weight of alkali metal silicate.

4. The composition of claim 1 wherein the amount of soy polysaccharide material is between about 2 and 8% by dry weight of alkali metal silicate.

5. The composition of claim 4 wherein the amount of soy polysaccharide material is between about 4 and 6% by dry weight of alkali metal silicate.

6. The composition of claim 1 wherein the soy polysaccharide material is spent flake fraction derived from soy isolate processing.

7. The composition of claim 1 wherein the alkali metal silicate is sodium silicate.

8. The composition of claim 1 wherein said soy polysaccharide material includes a wetting agent in an amount effective to improve dispersibility of said material in said solution.

9. The composition of claim 8 wherein the amount of wetting agent is between about 0.2 to 2.0% by weight of said material.

10. The composition of claim 1 wherein said soy polysaccharide material is ground to a particle size such that a substantial percentage thereof will pass a U.S. #100 mesh screen.

11. A silicate containing adhesive composition comprising an aqueous solution containing an alkali metal silicate in an amount of 20 to 45% by weight of said solution and a soy polysaccharide material in an amount of 1 to 25% by dry weight of the alkali metal silicate.

12. The composition of claim 11 wherein the amount of soy polysaccharide material is between about 2 and 8% by dry weight of alkali metal silicate.

13. The composition of claim 12 wherein the amount of soy polysaccharide material is between about 4 and 6% by dry weight of alkali metal silicate.

14. The composition of claim 11 wherein the soy polyssacharide material is a spent flake fraction derived from soy isolate processing.

15. The composition of claim 11 wherein the alkali metal silicate is sodium silicate.

16. The composition of claim 11 wherein said soy polysaccharide material includes a wetting agent in an amount effective to improve dispersibility of said material in the solution.

17. The composition of claim 16 wherein the amount of wetting agent is between about 0.2 to 2.0% by weight of said material.

18. The composition of claim 11 wherein the soy polysaccharide material is ground to a particle size such that a substantial percentage will pass a U.S. #100 mesh screen.

19. A process for the production of an adhesive composition for laminated paper products comprising:
   a. forming an aqueous solution of an alkali metal silicate, and
   b. adding to said solution a soy polysaccharide material in an amount effective to thicken said solution and improve the adhesive properties thereof.

20. The process of claim 19 wherein the aqueous solution contains between about 20 to 45% by weight of alkali metal silicate.

21. The composition of claim 19 wherein the amount of soy polysaccharide material is between about 1 to 25% by dry weight of alkali metal silicate.

22. The process of claim 19 wherein the amount of soy polysaccharide material is between 2 and 8% by dry weight of alkali metal silicate.

23. The process of claim 19 wherein the soy polysaccharide material is a spent flake fraction derived from soy isolate processing.

24. The process of claim 19 wherein the alkali metal silicate is sodium silicate.

25. The process of claim 1 wherein said soy polysaccharide material includes a wetting agent in an amount effective to improve dispersibility of said material in said solution.

26. The composition of claim 25 wherein the amount of wetting agent is between about 0.2 to 2.0% by weight of said material.